(12) United States Patent
Tarandek et al.

(10) Patent No.: US 9,663,083 B2
(45) Date of Patent: May 30, 2017

(54) RETAINING ASSEMBLY

(71) Applicant: Continental Teves AG & Co. oHG, Frankfurt (DE)

(72) Inventors: Kristijan Tarandek, Neu-Isenburg (DE); Thomas Sellinger, Dreieich (DE); Peter Drott, Frankfurt/Main (DE); Johannes Görlach, Langgöns (DE); Horst Krämer, Ginsheim-Gustavsburg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/027,589

(22) PCT Filed: Sep. 12, 2014

(86) PCT No.: PCT/EP2014/069480
§ 371 (c)(1),
(2) Date: Apr. 6, 2016

(87) PCT Pub. No.: WO2015/051973
PCT Pub. Date: Apr. 16, 2015

(65) Prior Publication Data
US 2016/0280194 A1    Sep. 29, 2016

(30) Foreign Application Priority Data

Oct. 11, 2013 (DE) .................... 10 2013 220 573
Jan. 31, 2014 (DE) .................... 10 2014 201 704

(51) Int. Cl.
*A47B 96/06*    (2006.01)
*B60T 11/16*    (2006.01)
*B60T 17/04*    (2006.01)

(52) U.S. Cl.
CPC ............. *B60T 11/16* (2013.01); *B60T 17/046* (2013.01)

(58) Field of Classification Search
CPC ......... B60R 21/09; B60T 7/065; B60T 17/046
See application file for complete search history.

(56) References Cited

U.S. PATENT DOCUMENTS

| 5,685,150 A | 11/1997 | Hinz |
| 6,322,284 B1 | 11/2001 | Bonardo |

(Continued)

FOREIGN PATENT DOCUMENTS

| DE | 4403466 | 8/1995 |
| DE | 10051126 | 5/2001 |

(Continued)

OTHER PUBLICATIONS

German Search Report for German Application No. 10 2014 201 704.1 mailed Oct. 8, 2014, including partial translation.

(Continued)

*Primary Examiner* — Amy Sterling
(74) *Attorney, Agent, or Firm* — RatnerPrestia

(57) ABSTRACT

A retaining assembly for fixing a flange part, which is provided on a braking device, to a firewall of a motor vehicle, the firewall separating an engine chamber from a vehicle interior. A retaining plate is secured to the firewall face facing the engine chamber, and the flange part and the retaining plate are engaged with each other by both a form-fitting as well as force-fitting connection.

14 Claims, 3 Drawing Sheets

(56) References Cited

U.S. PATENT DOCUMENTS

2004/0231453 A1* 11/2004 Harashima ............. B60R 21/09
                                                                    74/560
2008/0006119 A1* 1/2008 Tokumo ................. B60R 21/09
                                                                    74/560

FOREIGN PATENT DOCUMENTS

| DE | 69903881 | 9/2003 |
| --- | --- | --- |
| FR | 2781259 | 1/2000 |
| JP | 1129025 | 2/1999 |
| JP | 2011230577 | 11/2011 |

OTHER PUBLICATIONS

International Search Report for International Application No. PCT/EP2014/069480 mailed Nov. 25, 2014.
Written Opinion of the International Searching Authority for International Application No. PCT/EP2014/069480 mailed Nov. 25, 2014.

* cited by examiner

RETAINING ASSEMBLY

CROSS REFERENCE TO RELATED APPLICATIONS

This application is the U.S. National Phase Application of PCT International Application No. PCT/EP2014/069480, filed Sep. 12, 2014, which claims priority to German Patent Application No. 10 2013 220 573.2, filed Oct. 11, 2013 and German Patent Application No. 10 2014 201 704.1, filed Jan. 31, 2014, the contents of such applications being incorporated by reference herein.

FIELD OF THE INVENTION

The invention relates to a retaining subassembly for fixing a flange portion which is provided on a brake device to a bulkhead of a motor vehicle.

BACKGROUND OF THE INVENTION

A retaining subassembly for fixing a flange portion which is provided on a brake device to a bulkhead of a motor vehicle which separates an engine compartment from a vehicle inner space is known, for example, from DE 44 03 466 A1 which is incorporated by reference. The retaining subassembly has two stay bolts which are introduced from the flange portion of the brake device through the bulkhead into the vehicle inner space and which have to be screwed from the vehicle inner space. The complexity for fitting and removing the brake device again is consequently considerable as a result of the poor accessibility of the bulkhead in the vehicle inner space. Furthermore, the brake device has to be supported in the engine compartment at the same time in order to prevent it from tilting and falling out.

SUMMARY OF THE INVENTION

An aspect of the invention improves a retaining subassembly of the type set out in such a manner that, with the least possible structural and functional complexity, particularly simple and rapid assembly of the brake device on the bulkhead is ensured, wherein the supply, orientation and securing of the brake device is intended to be carried out using simple means exclusively at the side of the bulkhead facing the engine compartment.

BRIEF DESCRIPTION OF THE DRAWINGS

Other features of the invention can be taken from the individual patent claims and the description of an embodiment with reference to a plurality of drawings, in which:

DETAILED DESCRIPTION OF THE PREFERRED EMBODIMENTS

Figure 1:
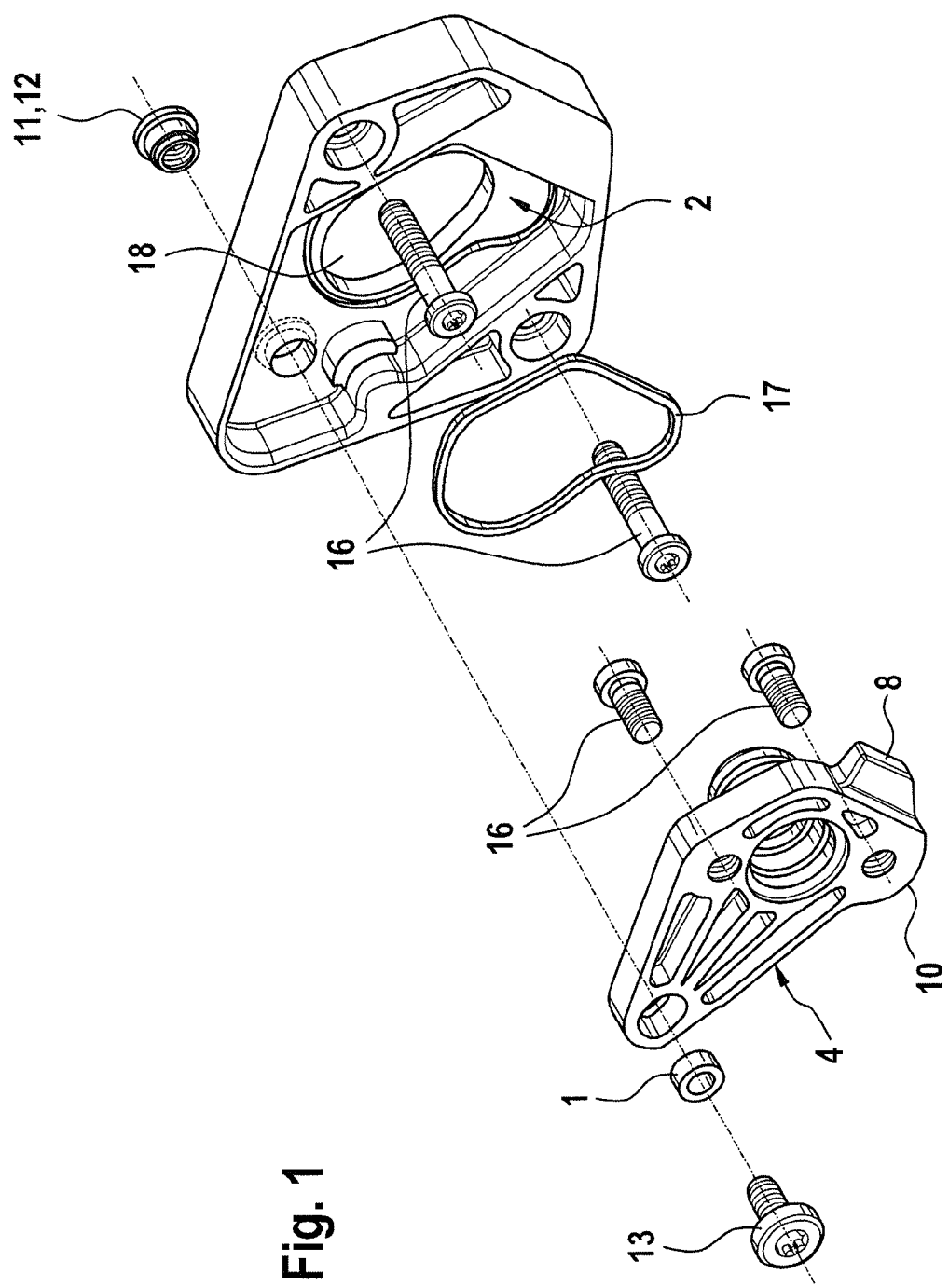
FIG. 1 is a perspective overall view of a retaining subassembly which is provided with the features significant to the invention for the purposes of mounting a brake device on a bulkhead of a vehicle.

FIG. 1 is a perspective view of the significant details of a retaining subassembly for fixing a flange portion 4 which is secured to a brake device to a retention plate 2 which is securely screwed to a bulkhead (not illustrated) of a motor vehicle and which separates an engine compartment from a vehicle inner space. The retention plate 2 and the flange portion 4 are coupled to each other by means of a positive-locking connection 3, which is explained below with reference to FIGS. 2 to 5.

FIG. 1 first shows the flange portion 4 which is intended to be secured by means of two screws 16 to the brake device which is not illustrated and the securing of the retention plate 2 to the bulkhead which is not illustrated by means of two retention screws 16, for which reason there is generally arranged inside the vehicle inner space on the bulkhead a pedal block, in which the two retention screws 16 after being introduced into the two through-holes of the retention plate 2 are screwed in order to secure the retention plate 2. Between the retention plate 2 and the bulkhead and between the retention plate 2 and the flange portion 4 there is arranged a seal 17 for protection against the introduction of moisture and dirt.

Figure 2:
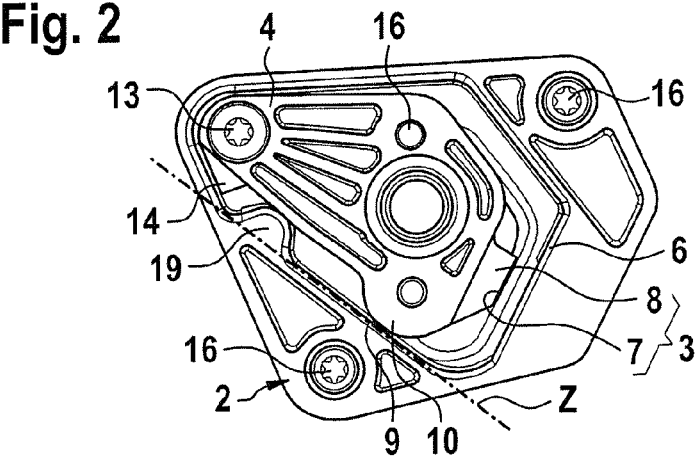
FIGS. 2 to 4 are plan views of the retaining subassembly with the illustration of individual assembly steps for securing a flange portion which carries the brake device on a retention plate which is connected to the bulkhead.
Figure 3:
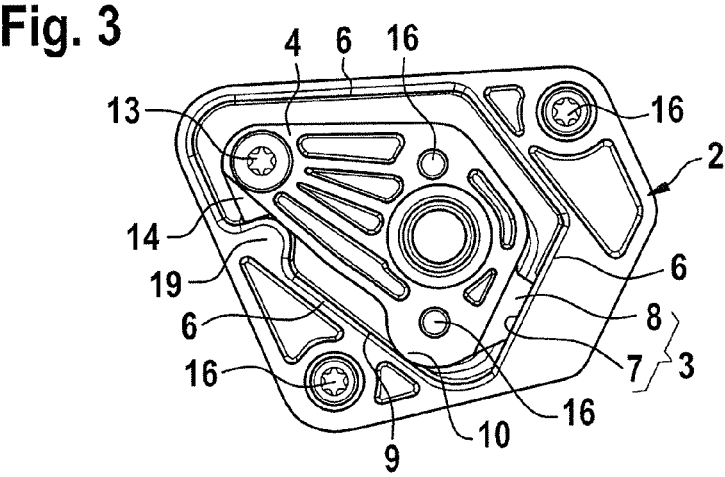
Figure 4:
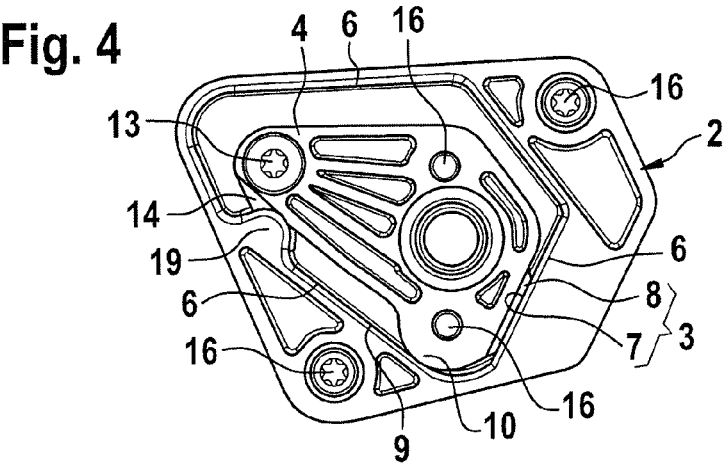

As can be seen in FIGS. 2, 3, 4 as a plan view of the retaining subassembly, there is provided diametrically with respect to the positive-locking connection 3 on the retaining subassembly a non-positive-locking connection 5 which can be seen in terms of all details and which has as a significant element a final fixing screw 13 which is illustrated in all the Figures.

Only after the introduction and displacement of the flange portion 4 inside a basin-like recess of the retention plate 2 in the direction of the positive-locking connection 3 (see FIGS. 2, 3) is the flange portion 4, after the production of the positive-locking connection 3 with the retention plate 2, finally in a state of connection which is produced permanently by the final fixing screw 3 (see FIG. 4), but which after removal of the final fixing screw 13 can also be readily released again.

In order to illustrate the inventively significant features, the illustration of the brake device which is securely connected to the flange portion 4 has been omitted in the selected plan views according to FIGS. 2 to 4 since the brake device in practice covers the flange portion 4. As a result of the spatial requirement necessary for the two retention screws 16 and the final fixing screw 13, the outer periphery of the retention plate 2 which is constructed in an asymmetrical manner is generously expanded in a radial direction. For recessed receiving of the flange portion 4 inside the retention plate 2, the retention plate 2 has a basin-like recess between the two retention screws 16 which are diagonally introduced into the retention plate 2, wherein the basin-like recess is delimited by a peripheral frame 6 which resembles the asymmetrical contour of the flange portion 4. As a result of the asymmetrical end face contour of the flange portion 4, the flange portion 4 extends radially outward in a flap-like manner for readily accessible receiving and securing of the final fixing screw 13 which is provided in the basin-like recess between the two retention screws 16 of the retention plate 2.

The retention plate 2 consequently receives for the purposes of space-saving rapid securing the flange portion 4 inside the basin-like recess, wherein, for the purposes of the most simple positive-locking connection 3 to the retention plate 2, the flange portion 4 is partially contacted by the frame 6 which delimits the recess. Diametrically relative to the positive-locking connection 3, there is fixed to the flange portion 4 the final fixing screw 13 which produces the non-positive-locking connection 5 with the retention plate 2, which connection can be clearly seen in FIG. 5 and which according to the assembly steps illustrated in FIGS. 2 to 4 is produced only after the precise orientation of the flange portion 4 on the retention plate 2.

For the advantageous construction of the positive-locking connection 3, the thick-walled frame 6 is provided at the side facing away from the non-positive-locking connection 5 with a recess which is preferably constructed as a groove 7 and in which a radial projection 8 which is constructed on the outer periphery of the flange portion 4 in the form of a detent or a wedge engages. FIGS. 2 to 4 illustrate in this regard individual engagement positions of the wedge-like projection 8 in the groove 7 after the supply and orientation of the flange portion 4 which is connected to the brake device within the basin-like recess of the retention plate 2.

For the precise positive-locking orientation of the flange portion 4 inside the basin-like recess of the retention plate 2, the retention plate 2 has along the lower portion of the frame 6 a support edge 9 which extends in a linear manner in the introduction direction of the flange portion 4 and which is contacted at the bottom and in an approximately orthogonally orientated manner with respect to the groove 7 by an additional projection 10 which is provided on the outer periphery of the flange portion 4. The support edge 9 is consequently formed in the manner of an oblique plane below the flange portion 4 by a linear portion of the frame 6 extending parallel with the displacement direction of the flange portion 4 in an oblique downward manner (see auxiliary line Z in FIG. 2) so that after the flange portion 4 has been introduced into the basin-like recess the projection 10 contacts the flange portion 4 along the auxiliary line Z and during the sliding-down action in the basin-like recess of the retention plate 2 is forcibly guided in a linear manner along the frame 6 which extends downward in an oblique manner, whereby the flange portion 4 is supplied with the brake device secured thereto with the wedge-like projection 8 thereof supported by gravitational force precisely to the groove 7 provided in the frame 6.

As can further be seen in FIGS. 2 to 4, there is provided on the obliquely downwardly directed linear portion of the frame 6 a groove-like blade receiving member 19 which is in engagement with a blade 14 which protrudes below the final fixing screw 13 on the periphery of the flange portion 4 as soon as the wedge-like projection 8 reaches the groove 7.

Consequently, the orientation of the flange portion 4 on the retention plate 2 is carried out in principle by means of a three-point bearing in the frame 6 by the blade 14 and the two projections 8, 10 which are orientated substantially orthogonally relative to each other contacting the frame 6. The final fixing of the flange portion 4 on the retention plate 2 as illustrated in FIG. 4 is ultimately carried out by the final fixing screw 13 which is provided above the blade 14 and which is already in a pre-mounted state in the flange portion 4 during the entire assembly operation.

Figure 5:
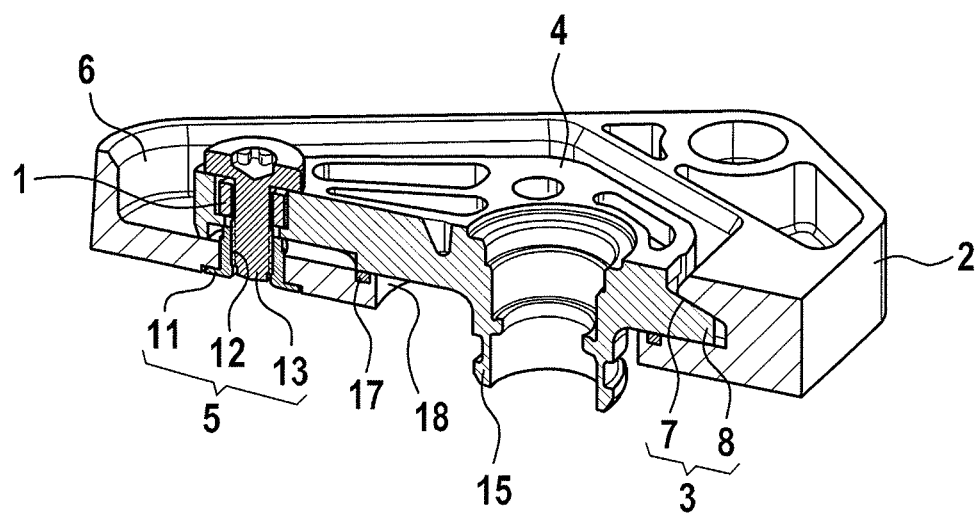
FIG. 5 is a perspective sectioned illustration through the retaining subassembly after the final fixing of the flange portion to the retention plate.

Based on the illustration in FIG. 4, the perspective illustration according to FIG. 5 additionally illustrates an inner thread 12 which is provided in the retention plate 2 and which is located as an element of the non-positive-locking connection 5 in a diametric orientation with respect to the two elements (groove 7, projection 8) of the positive-locking connection 3 in a threaded sleeve 11 which is supported with the collar thereof in a hole of the retention plate 2. As a significant component of the non-positive-locking connection 5, the final fixing screw 13 is already introduced from the direction of the brake device in a through-hole in the flange portion 4 and screwed in the threaded sleeve 11 so as to be readily accessible.

It is further possible to see in FIG. 5 a retention ring 1 which is inserted in the through-hole of the flange portion 4 and which advantageously enables reliable preassembly of the final fixing screw 13 on the flange portion 4 by, according to the above FIGS. 1 to 4, the final fixing screw 13 on the flange portion 4 already being received in the retention ring 1 in a frictionally engaging manner before the ultimate orientation of the flange portion 4 on the retention plate 2.

In order to ensure secure receiving of the final fixing screw 13 in the retention ring 1 and secure receiving of the retention ring 1 in the flange portion 4, the retention ring 1 preferably comprises a resilient plastics material or a rubber which produces both with the flange portion 4 and with the final fixing screw 13 the required frictionally engaging connection.

It can further be clearly seen in FIG. 5 that the flange portion 4 is constructed as a plate which is partially adapted to the inner contour of the retention plate 2 and which is provided in order to guide a pedal rod with a tubular continuation 15 which extends through an elongate-hole-like or oval opening 18 in the retention plate 2, wherein the elongate-hole-like or oval opening 18 is adapted to the radial displacement extent of the flange portion 4 required for the assembly of the flange portion 4 on the retention plate 2 (see assembly steps in FIGS. 2 to 4).

The retention plate 2 and the flange portion 4 comprise a cast material which can be produced in a cost-effective manner, in particular a die-cast light metal so that there is provided a retention device which is simple to construct with respect to the projection 10 and which has oblique contact faces which are simple to constitute within the positive-locking connection 3 (in the region of the projection 8 and the groove 7) in order to be able to produce the positive-locking connection 3 in a play-free manner in the final fixing of the flange portion 4 on the retention plate 2, in particular in an axial direction of the brake device.

Further ease of assembly results from the final fixing screw 13 being received in the retention ring 1 of the flange portion 4, whereby confusion with other screws can be eliminated and the brake device can immediately be securely screwed in the final orientation of the flange portion 4 on the retention plate 2. Furthermore, the receiving of the final fixing screw 13 in the retention ring 1 facilitates the location of the thread 12 in the retention plate 2.

LIST OF REFERENCE NUMERALS

1 Retention ring
2 Retention plate
3 Positive-locking connection
4 Flange portion
5 Non-positive-locking connection
6 Frame
7 Groove
8 Projection
9 Support edge
10 Projection
11 Threaded sleeve
12 Thread
13 Final fixing screw
14 Blade
15 Continuation
16 Retention screw
17 Seal
18 Opening
19 Blade receiving member

The invention claimed is:

1. A retaining subassembly for fixing a flange portion which is provided on a brake device to a bulkhead of a motor vehicle which separates an engine compartment from a vehicle inner space, wherein at a side of the bulkhead facing away from the engine compartment there is secured a retention plate which receives inside a recess the flange portion which in order to guide and to form a positive-locking connection with the retention plate is partially contacted by a frame which delimits the recess, and wherein in order to form the positive-locking connection, the frame is provided with a groove in which a radial projection which is formed on the outer periphery of the flange portion in the form of a detent or a wedge is positioned.

2. The retaining subassembly as claimed in claim 1, wherein, in order to secure the flange portion to the retention plate, a non-positive-locking connection is provided diametrically with respect to the positive-locking connection.

3. The retaining subassembly as claimed in claim 1, wherein the frame has for precise orientation of the flange portion on the retention plate a support edge which is contacted in a manner orientated substantially orthogonally with respect to the groove by an additional projection which is provided on the outer periphery of the flange portion.

4. A retaining subassembly for fixing a flange portion which is provided on a brake device to a bulkhead of a motor vehicle which separates an engine compartment from a vehicle inner space, wherein at a side of the bulkhead facing away from the engine compartment there is secured a retention plate which receives inside a recess the flange portion which in order to guide and to form a positive-locking connection with the retention plate is partially contacted by a frame which delimits the recess,
    wherein, in order to form the positive-locking connection, the frame is provided with a groove in which a radial projection which is formed on the outer periphery of the flange portion in the form of a detent or a wedge engages,
    wherein the frame has for precise orientation of the flange portion on the retention plate a support edge which is contacted in a manner orientated substantially orthogonally with respect to the groove by an additional projection which is provided on the outer periphery of the flange portion, and
    wherein the support edge below the positive-locking connection is formed by a linear portion of the frame, which portion extends in an oblique manner downward parallel with the displacement direction of the flange portion inside the recess of the retention plate.

5. The retaining subassembly as claimed in claim 4, wherein there is provided on the linear portion of the frame a blade receiving member which is in engagement with a blade which is formed on the periphery of the flange portion.

6. The retaining subassembly as claimed in claim 2, wherein as a component of the non-positive-locking connection in a diametrical orientation with respect to the positive-locking connection in the retention plate there is provided an inner thread in which as an additional component of the non-positive-locking connection a final fixing screw which extends through the through-hole in the flange portion is screwed from the direction of the brake device.

7. A retaining subassembly for fixing a flange portion which is provided on a brake device to a bulkhead of a motor vehicle which separates an engine compartment from a vehicle inner space, wherein at a side of the bulkhead facing away from the engine compartment there is secured a retention plate which receives inside a recess the flange portion which in order to guide and to form a positive-locking connection with the retention plate is partially contacted by a frame which delimits the recess,
    wherein, in order to secure the flange portion to the retention plate, a non-positive-locking connection is provided diametrically with respect to the positive-locking connection,
    wherein as a component of the non-positive-locking connection in a diametrical orientation with respect to the positive-locking connection in the retention plate there is provided an inner thread in which as an additional component of the non-positive-locking connection a final fixing screw which extends through the through-hole in the flange portion is screwed from the direction of the brake device, and
    wherein for the pre-fixing of the final fixing screw to the flange portion in the through-hole of the flange portion there is arranged a retention ring which comprises a resilient plastics material or a rubber.

8. The retaining subassembly as claimed in claim 1, wherein the flange portion is constructed as a plate which is partially adapted to the inner contour of the retention plate and which is provided for guiding a pedal rod with a tubular continuation which extends through an elongate-hole-like or oval opening in the retention plate.

9. A retaining subassembly for fixing a flange portion which is provided on a brake device to a bulkhead of a motor vehicle which separates an engine compartment from a vehicle inner space, wherein at a side of the bulkhead facing away from the engine compartment there is secured a retention plate which receives inside a recess the flange portion which in order to guide and to form a positive-locking connection with the retention plate is partially contacted by a frame which delimits the recess,
    wherein the flange portion is constructed as a plate which is partially adapted to the inner contour of the retention plate and which is provided for guiding a pedal rod with a tubular continuation which extends through an elongate-hole-like or oval opening in the retention plate, and
    wherein the elongate-hole-like or oval opening is adapted to the radial displacement extent of the flange portion as required for the assembly of the flange portion on the retention plate.

10. The retaining subassembly as claimed in claim 1, wherein, before securing the flange portion to the retention portion, the flange portion is secured to the brake device by two retention screws.

11. The retaining subassembly as claimed in claim 1, wherein, before securing the flange portion to the retention portion, the retention plate is fixed to the bulkhead by two retention screws.

12. A retaining subassembly for fixing a flange portion which is provided on a brake device to a bulkhead of a motor vehicle which separates an engine compartment from a vehicle inner space, wherein at a side of the bulkhead facing away from the engine compartment there is secured a retention plate which receives inside a recess the flange portion which in order to guide and to form a positive-locking connection with the retention plate is partially contacted by a frame which delimits the recess, and wherein a seal is arranged between the retention plate and the flange portion.

13. The retaining subassembly as claimed in claim 1, wherein the retention plate and the flange portion are produced from a cast material.

14. The retaining subassembly as claimed in claim 2, wherein in order to form the positive-locking connection, the frame is provided with a groove in which a radial projection which is formed on the outer periphery of the flange portion in the form of a detent or a wedge engages.

* * * * *